United States Patent [19]
Moser

[11] 3,847,801
[45] Nov. 12, 1974

[54] PROCESS FOR SEPARATING HYDROCARBON

[75] Inventor: William R. Moser, Westfield, N.J.

[73] Assignee: Exxon Research Engineering Company, Linden, N.J.

[22] Filed: Dec. 27, 1972

[21] Appl. No.: 318,876

[52] U.S. Cl. .............................. 208/308, 260/688
[51] Int. Cl. ........................................ B01d 17/00
[58] Field of Search ..................... 260/688; 208/308

[56] References Cited
UNITED STATES PATENTS

| | | | |
|---|---|---|---|
| 3,379,710 | 4/1968 | Ellis | 260/688 |
| 2,478,243 | 8/1949 | Coe et al. | 260/688 |
| 2,656,395 | 10/1953 | Benson | 260/688 |
| 3,366,686 | 1/1968 | Rosenthal et al. | 260/688 |
| 3,658,922 | 4/1972 | Drake | 260/688 |

*Primary Examiner*—Herbert Levine
*Attorney, Agent, or Firm*—John Paul Corcoran; Robert J. Baran

[57] ABSTRACT

A process for the selective separation of constituents contained in a liquid hydrocarbon and chloro substituted hydrocarbon mixture, said constituents being paraffins, isoparaffins, naphthenes, olefinic hydrocarbons, aromatics and chlorinated aromatic compounds by selectively removing one of the constituents through forming nitrated compounds by reacting with NO.

5 Claims, No Drawings

PROCESS FOR SEPARATING HYDROCARBON

This invention relates to a process for either the separation or upgrading of various hydrocarbon streams. In one aspect, this invention relates to the use of nitric oxide for selectively removing various components contained in hydrocarbon mixtures.

In a copending application bearing Ser. No. 318,875 filed Dec. 27, 1972 in the name of W. R. Moser, a process is described and claimed for the liquid phase reduction of nitric oxide with a hydrocarbon under mild noncatalytic conditions.

The reaction and selectivities of $N_2O_4$, $NO_2$ and $N_2O_3$ with hydrocarbons have been described in the prior art. For example, A. V. Topchiev, Nitration of Hydrocarbons and Other Organic Compounds, Pergamon Press, New York, 1959, pp. 226–268. W. H. Baum, J. G. Crist and E. V Nagel, U.S. Pat. No. 3,428,414 Appl. June 2, 1966; M. Schienbaum, J. Org. Chem., 35, 2785 (1970).

However, the reaction of nitric oxide with liquid phase hydrocarbons in the absence of oxidants, catalysts, photo-induction, or other initiating molecules in unknown to those skilled in the art. Furthermore, its selectivity towards reaction with various hydrocarbons is also unknown.

Briefly, the subject invention relates to a process for the selective separation of constituents contained in a liquid hydrocarbon and chlorosubstituted hydrocarbon mixture, said consitituents being paraffins, isoparaffins, naphthenes, olefinic hydrocarbons, aromatic and chlorosubstituted aromatic compounds, said process comprising the steps of
1. Continuously contacting said liquid mixture with NO at a temperature and pressure sufficient to cause a reaction with at least one of said constituents contained in said mixture to form a nitrated compound;
2. Isolating the nitrated compound resulting in Step 1 and leaving behind an effluent;
3. Successively repeating Steps 1 and 2 until
   a. the nitrated compound which results is that of the particular constituent which has the highest order of reacting with said NO, or
   b. the effluent comprises substantially a single, unreacted constituent and recovering the said particular constituent by removal from the nitrated compound from Step 3(a) by standard procedures, e.g., flash distillation.

This separations process has special advantage since the combustion stack gases from refineries, factories, plants, etc. provide local, cheap sources of nitric oxide.

It has been discovered that pure NO or its admixture with inert gases reacts with hydrocarbons in the following order of decreasing reactivity: olefinic > saturated > alkyl aromatics > unsubstituted aromatic hydrocarbons. The unexpected observation that saturated hydrocarbons react faster than aromatics is of special significance. This invention has the further advantage that the reaction of nitric oxide with saturated hydrocarbons generally obeys the following order of group reactivity with respect to carbon-hydrogen bonds:

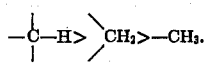

Furthermore, alkylated aromatics reacted with nitric oxide according to the following order: polyalkyl > trialkyl > dialkyl > monoalkyl aromatic. It has further been observed that the positional isomers of alkylated aromatics react in order of para > ortho > meta.

Illustrative hydrocarbons include the propanes, butanes, hexanes, heptanes, octanes, nonanes, undecanes, dodecanes and their higher homologs; cyclopropanes, cyclobutanes, cyclopentanes, cyclohexanes, cycloheptanes, cyclooctanes, and their higher cyclic homologs; benzene and its alkyl homologs, toluene, xylene, ethylbenzene, propylbenzene, tetralin, mesitylene, cumene, durene and the like; isomeric alkylated hydrocarbons, para-xylene, meta-xylene, ortho-xylene, ethylbenzene; isomeric saturated alkanes, n-hexane, 2,3-dimethylbutane, 2,2-dimethylbutane, 2-methylpentane, 3-methylpentane, n-octane, 2,2,4-trimethylpentane, 2,3,4-trimethylpentane, 2,4-dimethylhexane, 3-methylheptane and the like; propene, butenes, pentenes, cyclohexenes, cycloheptenes, cyclooctenes and higher homologs and higher alkylated homologs; aromatic olefins, cis- and trans-stilbene, styrene and the like.

The most preferred hydrocarbon compounds for reasons of availability and ease of NO reduction are those alkylated aromatic hydrocarbons containing 7 to 25 carbon atoms.

Based upon considerable experimentation, it is possible to disclose workable and preferred parameters in terms of volumes of the liquid hydrocarbons that are contacted per unit time with the gaseous NO compounds and the ratio of the hydrocarbon to the NO concentration of the effluent in the various streams emanating from stationary sources as well as mobile sources.

The reaction must be run in the presence of a liquid hydrocarbon such as those enumerated hereinabove.

The reaction can be run in the presence of an inert gaseous diluent such as nitrogen, neon, argon and the like.

In running these systems, the mole ratio of hydrocarbon to nitric oxide will normally range from 500:1 to 0.04:1. Lower mole ratios give low rates of reaction over the temperatures of 0° to 500°C and are therefore unsatisfactory. Higher ratios are generally more costly. Molar volume ratios of 10 to 0.5 volumes of hydrocarbon for each molar volume of nitric oxide give good results and are hence preferred.

Higher flow rates may accelerate the rate of reaction at a given temperature since they may increase the quantity of NO brought into contact with the hydrocarbon substrate.

However, flow rates of effluent gases between about 0.1 to 25 volumes per minute per volume of liquid hydrocarbon have been successfully employed while the best results have been obtained with flow rates per unit time from about 0.5 to 5 volumes per minute per volume of hydrocarbon compound. The flow rate of gases used ordinarily depend upon the quantity of hydrocarbon compound, the size of the reactor, the pressure and the rate of mixing of liquid and gas phases.

Utilizing reaction temperatures and reaction times as indicated previously, good results have been obtained with reaction temperatures ranging between 0° and 500°C. Lower temperatures give little or no reaction particularly with a more sluggishly reactive saturated aliphatic while higher temperatures give rise to compounds which are not particularly desired when the more reactive olefins are used as substrates. The reasonable balance between reaction rate and quality of product can usually be obtained at temperatures ranging between about 100° and 225°C. and for these reasons this represents a preferred operating temperature range.

The reaction time is a variable dependent upon the acitvity of the particular hydrocarbon compound employed, the mole ratio of nitric oxide to the hydrocarbon compound, the nitric oxide pressure over the hydrocarbon, the flow rate, the mixing rate and the reaction temperature. Ordinarily the reaction produces molecular nitrogen and organic nitro compounds immediately but can require as long as several days when the more recalcitrant paraffins are the substrates.

In order to describe the workings of the invention, the inventive process is described in the following illustrative examples.

EXAMPLE 1

The hydrocarbons (0.15 mole) in Table I were, excepting the solid compounds, passed through alumina and degassed by the freeze-thaw method. They were then placed in a glass autoclave and degassed again at 165°C by argon pressurization-depressurization cycles. Nitric oxide was pressurized into the reactor several times to 80 psi; finally the hydrocarbon was then saturated with nitric oxide at a pressure near 80 psi. Then the pressure was adjusted to 80 psi and the rate of decrease of nitric oxide pressure was recorded. The rate data were computer analyzed by a standard linear regression analysis which was designed to correct observed pressures for the concomitant formation of molecular nitrogen. Table I shows the rate constants for the experimentally observed second order dependence of nitric oxide consumption from the gas phase for each hydrocarbon at 165°C and 80 psi initial nitric oxide pressure.

The lowest reacting compounds were found to slowly react at 400 psi nitric oxide pressure and 168°C.

This example demonstrates that nitric oxide reacts with (a) olefins in preference to other hydrocarbons, (b) longer chain paraffins in preference to short chain paraffins, (c) trialkyl > dialkyl > monoalkyl aromatics > unsubstituted aromatics > haloaromatics, (d) saturated hydrocarbons at equal or greater rates than its reaction with alkyl aromatics or aromatics, (e) positional isomers of alkylated aromatics at different rates.

EXAMPLE 2

A typical $C_6$-isomerate stream consisting of 0.66 g of 2,2-dimethylbutane, 0.23 g of 2,3-dimethylbutane, 0.67 g of 2-methylpentane, 0.37 g of 3-methylpentane, and 0.26 g of n-hexane was degassed and heated with nitric oxide at 168°C at an initial pressure of 400 psi. Gas chromatographic analysis of the final mixture showed that 59.3 percent of the starting hydrocarbons has been consumed. The relative uncorrected molar reactivity ratios for the individual hydrocarbons were determined as follows: 2,2-dimethylbutane (1.00), n-hexane (1.52), 2-methylpentane (2.63), 3-methylpentane (2.69), and 2,3-dimethylbutane (4.26).

A similar competition reaction utilizing equimolar isomeric octanes at 168°C and 100 psi nitric oxide pressure after 28 percent conversion showed the following relative order of molar reactivity: 2,2,4-trimethylpentane (1.00), n-octane (1.52), 3-methylheptane (2.58), and 2,3,4-trimethylpentane (3.51).

Extensive competition experimentation utilizing equimolar concentrations of aromatics and saturated hydrocarbons at 168°C and 100–300 psi nitric oxide pressure, afforded the following order of reactivity. Isopropyl benzene was the reference compound and assigned a value of 100.

| Compound | Relative Reactivity |
|---|---|
| isopropyl benzene | (100) |
| ethylbenzene | 45.1 |
| cyclooctane | 40.9 |
| mesitylene | 28.7 |
| cycloheptane | 22.0 |
| para-xylene | 18.6 |
| methylcyclopentane | 18.6 |
| 2,3-dimethylbutane | 18.4 |
| 2,3,4-trimethylpentane | 16.3 |
| ortho-xylene | 14.7 |
| n-hexadecane | 13.9 |
| n-tetradecane | 12.8 |
| 3-methylheptane | 12.2 |
| ortho-xylene | 10.6 |
| 2,4-dimethylhexane | 10.5 |
| 3-methylpentane | 10.3 |
| n-undecane | 9.4 |
| n-decane | 8.7 |
| cyclohexane | 7.4 |
| cyclopentane | 6.9 |

TABLE I

| Compound | Rate Constant* | Compound | Rate Constant* |
|---|---|---|---|
| Cyclooctene | 16.04 | Toluene | 0.60 |
| cis-Stilbene | .50 | Ethylene Benzene | 1.91 |
|  |  | Iso-Propyl Benzene | 1.89 |
| Undecane | 3.36 | t-Butyl Benzene | 0.09 |
| Hexadecane | 2.31 |  |  |
| Tetradecane | 1.88 | p-Xylene | 1.88 |
| n-Octane | 2.03 | o-Xylene | 2.11 |
| n-Heptane | 0.67 | m-Xylene | 2.24 |
| Cyclooctane | 2.72 | Tetralin | 0.49 |
| n-Octane | 2.03 | Diphenyl Methane | ca. 0.13 |
| 2,2,4-Trimethyl Pentane | (0.26) | Fluorene | ca. 0.07 |
|  |  | Triphenyl Methane | ca. 0.01 |
|  |  | Benzene | 0.00 |
| Toluene | 0.60 | Chlorobenzene | 0.00 |
| p-Xylene | 1.88 | Dichlorobenzene | 0.00 |
| Mesitylene | 2.32 | Tia Juana Resid (Atm.) | 0.00 |

*Pressure standardized at 25°C.

-Continued

| Compound | Relative Reactivity |
|---|---|
| n-octane | 6.0 |
| n-heptane | 4.5 |
| toluene | 4.3 |
| n-hexane | 3.9 |
| 2,2,4-trimethylpentane | 3.8 |
| 2,2-dimethylbutane | 1.2 |
| benzene | <0.001 |

The order of group reactivities calculated from the above competition data is as follows. The reacting hydrogen atom is underlined.

| Functional group | Relative reactivities |
|---|---|
| Ar-$\underline{H}$ | 0.004 |
| Alk-$\underline{C}H_3$ | 1.0 |
| Alk-$\underline{C}H_2$ | 3.5 |
| Alk-$\underline{C}\overline{H}_3$ | 15 |
| (CH$_2$)$_3$$\underline{C}H_2$ (ring) | 4.5 |
| (CH$_2$)$_4$$\underline{C}H_2$ (ring) | 5.5 |
| (CH$_2$)$_6$$\underline{C}H_2$ (ring) | 12 |
| (CH$_2$)$_7$$\underline{C}H_2$ (ring) | 20 |
| (CH$_2$)$_4$$\underline{C}$(alk)(H) (ring) | 50 |
| Ar-C$\underline{H}_3$ | 17 |
| Ar-C$\underline{H}_2$-alk | 170 |
| Ar-C$\underline{H}$-(alk)$_2$ | 380 |

This example demonstrates the feasibility of using nitric oxide to selectively remove hydrocarbons from isomeric mixtures, and the general order of carbon-hydrogen bond reactivity is defined i.e., tertiary C—H > secondary C—H > primary C—H.

EXAMPLE 3

A synthetic blend of fuel containing n-hexane, n-heptane, benzene and toluene having a Research Octane Number (RON) of 59 was allowed to react with nitric oxide at 110 psi initial pressure at 165°C. After 30 percent conversion, analysis of the hydrocarbon fraction showed a composition equivalent to a RON of 75.

This example demonstrates that basic fuel stocks may be upgraded by this process by selectively removing the low octane components from the mixture. This process has the further advantage that it may be carried out at a refinery utilizing nitric oxide which is generated in its combustion furnaces.

What is claimed is:

1. A process for the selective separation of constituents contained in a non-olefinic liquid hydrocarbon mixture, said constituents being selected from the group consisting of normal paraffins, isoparaffins, naphthenes, and aromatic compounds, said method comprising the steps of:
   1. contacting said liquid mixture with a purified stream containing only NO at a temperature and pressure sufficient to cause a reaction between the NO and at least one of said constituents contained in said mixture to form a nitrated compound;
   2. isolating the nitrated compound resulting in Step 1 and leaving behind an effluent;
   3. successively repeating Steps 1 and 2 until
      a. the nitrated product which results is that of the constituent in said effluent which has the highest order of reacting with said NO and whose parent hydrocarbon can be recovered by catalytic hydrogenation, or
      b. the effluent comprises substantially a single, uncomplexed consitiuent and recovering the said particular constituent by flash distillation from the product from Step 3(a).

2. A process according to claim 1 wherein the liquid hydrocarbon is one consisting of cyclooctene, cis-stilbene, undecane, hexadecane, tetradecane, octane, heptane, cyclooctane, n-octane, 2,2,4-trimethyl pentane, toluene, p-xylene, mesitylene, toluene, ethyl benzene, isopropyl benzene, t-butyl benzene, p-xylene, o-xylene, m-xylene, tetralin, diphenyl methane, triphenyl methane, benzene, and Tia Juana Residuum.

3. A process according to claim 1 wherein the liquid hydrocarbon is one consisting of isopropyl benzene, ethylbenzene, cyclooctane, mesitylene, cycloheptane, para-xylene, methylcylopentane, 2,3-dimethylbutane, 2,3,4-trimethylpentane, ortho-xylene, n-hexadecane, n-tetradecane, 3-methylheptane, ortho-xylene, 2,4-dimethylhexane, 3-methylpentane, n-undecane, n-decane, cyclohexane, cyclopentane, n-octane, n-heptane, toluene, n-hexane, 2,2,4-trimethylpentane, 2,2-dimethylbutane and benzene.

4. A process according to claim 1 wherein an octane number of a basic fuel stock is upgraded.

5. A process according to claim 1 wherein the temperature ranges from 100° to 225°C and the pressure of the nitric oxide ranges from 100 to 300 psi.

* * * * *